United States Patent [19]

Gleason

[11] 3,961,176

[45] June 1, 1976

[54] ADJUSTABLE LAMP STAND

[76] Inventor: Lawrence E. Gleason, 140 Hackberry Hill, Long Lake, Minn. 55356

[22] Filed: Apr. 26, 1972

[21] Appl. No.: 247,784

[52] U.S. Cl. .............................. 240/81 BC; 240/70; 240/81 BD; 248/170

[51] Int. Cl.[2] ...................... F21S 1/12; F16M 11/38

[58] Field of Search ......... 240/81 C, 81 BA, 81 BC, 240/81 BD, 81 BE, 70, 81 R, 67 R, 81 BS; 248/168, 170, 413

[56] References Cited

UNITED STATES PATENTS

| | | | |
|---|---|---|---|
| 1,045,583 | 11/1912 | Mills | 240/81 BC |
| 1,543,293 | 6/1925 | Nelson | 240/81 C |
| 2,691,501 | 10/1954 | Spencer | 248/168 |
| 2,940,708 | 6/1960 | Grimal | 248/168 |
| 3,026,409 | 3/1962 | Deisch | 240/67 X |
| 3,188,460 | 6/1965 | Thorsen et al. | 240/81 BE |
| 3,543,019 | 11/1970 | Jacobsen | 240/70 X |
| 3,586,852 | 6/1971 | Bradley | 240/81 BD |
| 3,591,115 | 7/1971 | Hibbard | 248/122 |

*Primary Examiner*—L. T. Hix
*Assistant Examiner*—E. M. O'Connor
*Attorney, Agent, or Firm*—Burd, Braddock & Bartz

[57] ABSTRACT

An adjustable lamp stand having a column rotatable about a base to a selected inclined position as desired by the user. The column is vertically adjustable in height. The base includes a plurality of legs pivotally attached to the column by a continuous brake friction joint. Lamp retaining means disposed on the column releasably hold a portable lamp. The lamp stand can be used in a generally vertical position or in a prone position or can be supported between spaced apart relatively horizontal or somewhat inclined surfaces. The stand is collapsible into a compact portable unit for easy transport and storage.

9 Claims, 12 Drawing Figures

ADJUSTABLE LAMP STAND

BACKGROUND OF THE INVENTION

Mechanics, repairmen, technicians and other workmen in practicing their respective trades, frequently find need for portable lamps for high intensity localized illumination of a working area. For example, mechanics frequently utilize a socalled trouble light when repairing automobiles. The trouble light is a portable lamp having a light surrounded by a suitable guard. The lamp is provided with a handle having an on-off switch. On the guard there is a hook whereby the lamp may be suspended in the vicinity of the work area. Frequently, there is no suitable location to suspend the lamp and it must be lain somewhere in the working area. Obtaining the required illumination is difficult. There is no allowance for adjustment of the position of the lamp. If the mechanic is working on a lower portion of the car while it is supported on the ground, the trouble light usually must be positioned on the ground.

In the past, portable lamps having stands have been provided to illuminate local work areas. For example, see U.S. Pat. No. 3,275,824 to Hinds and U.S. Pat. No. 3,462,594 to Brown. Such lamp stands are typically heavy and awkward, having outwardly extended arms to hold the light over the working area, thus necessitating a heavy base. Light stands have been provided with tripod bases. See U.S. Pat. No. 2,165,562 to Mack et al. The lamp stands must be supported on level ground. Lamp stands which, because of their weight, must be provided with rollers or casters, are not readily adapted for use on irregular, uneven or sloping ground. See U.S. Pat. No. 2,352,496 to Rose and U.S. Pat. No. 3,077,537 to Squier.

SUMMARY OF THE INVENTION

The invention relates to a stand for holding a portable lamp of the trouble light variety. Portable lamp retaining means are disposed on a column supported on a base. The column, when the lamp stand is disposed in a generally vertical orientation, is adjustable in height. The lamp retaining means are angularly adjustable to direct light in any desired direction. The base includes a plurality of legs secured to the column by continuous brake friction joints. The lamp is positionable over a selected work area by rotating the column about the base whereby the column assumes a tilted orientation. The continuous brake friction joints of the base maintain the column in the tilted orientation. In a preferred embodiment, the column is composed of a pair of telescoping members. A shaft member having the lamp retaining means telescopes into a post member having the base means. The shaft is removable from the post and insertable in the opposite end whereby the stand is usable in a generally prone orientation for the illumination of low areas. Also, the stand may be supported between a plurality of relatively horizontal surfaces. As the legs of the base are individually pivotally adjustable, the stand is usable on uneven, irregular or sloping ground. The stand is collapsible into a compact unit for storage or transport.

Figure 1:
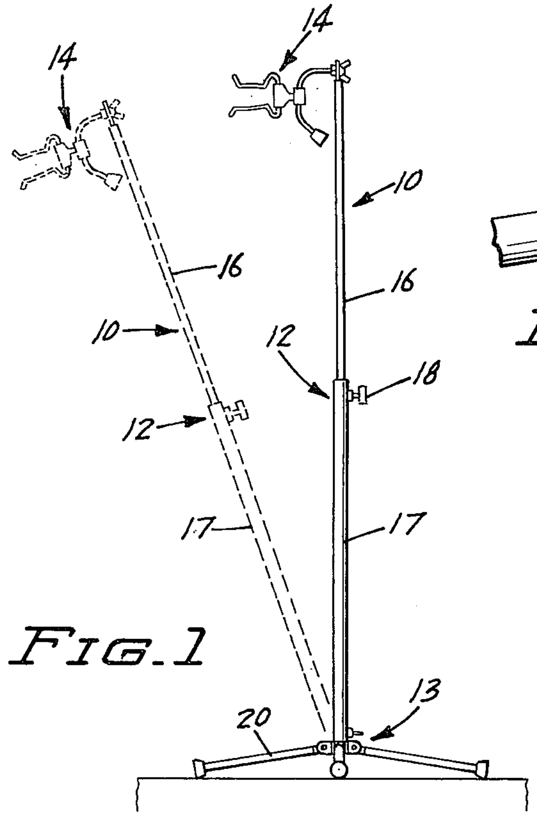
FIG. 1 is an elevational view of the lamp stand of the invention in a generally vertical upright orientation and showing, in phantom, the lamp stand in a tilted orientation.
Figure 5:
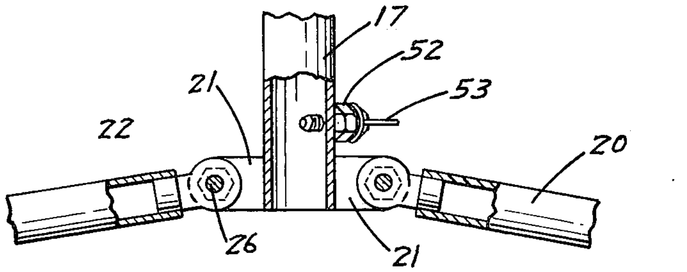
FIG. 5 is a vertical sectional view of the base of the lamp stand taken along the line 5—5 of FIG. 4.
Figure 9:
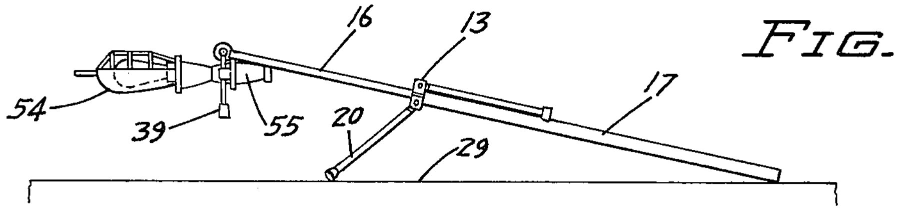
FIG. 9 is a side elevational view of the lamp stand of the invention in a generally prone orientation.
Figure 10:
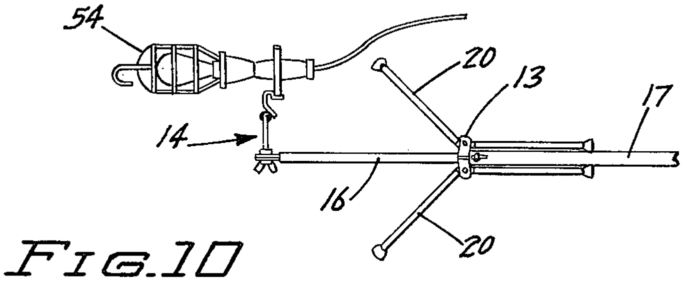
FIG. 10 is a fragmentary top plan view of the lamp stand in the generally prone orientation of FIG. 9.

DESCRIPTION OF A PREFERRED EMBODIMENT:

Referring now to the drawings, there is shown in FIG. 1 the lamp stand of the invention, indicated generally at 10, in a generally vertical orientation. The lamp stand 10 includes a standard or column 12 supported on a base 13 and having at the upper portion thereof lamp retaining means 14. The lamp retaining means 14 is adapted to releasably hold a portable lamp such as a so-called trouble light, as shown in FIGS. 9 and 10, but omitted from FIG. 1 for purposes of clarity. Column 12 is comprised of two telescoping members including an elongated shaft member 16 telescopically engaging a hollow tubular pole member 17. Shaft 16 is slidably adjustable in the tubular member 17 and may be locked in a preselected upwardly extended position by releasable securing means shown to include a thumb screw or set screw 18 located in the upper portion of tubular member 17 in the usual manner.

In FIG. 1, there is shown in phantom the column 12 in a tilted orientation supported by the novel base 13 of the invention. The column 12 is readily adjustable to any desired angular position relative to the base 13 whereby a lamp secured by the retaining means is positioned at whatever location is desired by the user. For example, a mechanic working on the engine of an automobile may position the base 13 adjacent the automobile and rotate the column 12 about the base 13 to a location where a lamp positioned in the retaining means 14 is directly over the automobile engine, thereby providing a better lighted working area.

Figure 4:
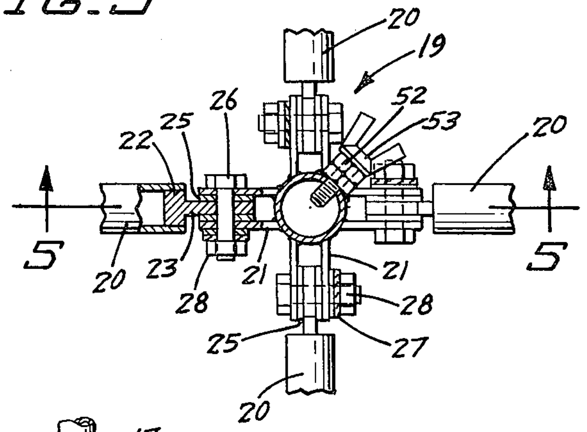
FIG. 4 is an enlarged horizontal sectional view of the base of the lamp stand taken along the line 4—4 of FIG. 2.

Base 13, as best shown by FIGS. 2–5, includes a plurality of outwardly extended legs 20 movably or pivotally attached to a portion of the tubular pole member 12 and frictionally restrained from pivotal movement. Four legs 20 are symmetrically positioned about the tubular member 12, each leg being individually pivotally assembled to it by a continuous brake friction joint 19. As shown by FIG. 4, each joint includes a pair of outwardly extended arms defining a bifurcated or U-shaped bracket 21 and a flange portion 23. As shown, each bracket 21 is fastened to the member 12. The interior end of a leg 20 is provided with an end plug 22 having a flat projecting flange 23. The flange 23 is accommodated between the opposing arms of a bracket 21. Washers 25 are disposed on either side of the flange 23. Frictional pivot means operatively associate the flange and the bracket for pivotal movement of one with respect to the other. As shown, a bolt 26, passing through mutually aligned holes provided in the bracket 21, the washers 25 and the flange 23, is secured by a suitable lock washer 27 and a nut 28. The nut 28 is tightened sufficiently that the leg 20 is normally frictionally retained in position but is pivotally movable about the bolt 26 upon the application of sufficient force. In practice, the use of washers 25 of aluminum properties has proven optimum. It is understood that other continuous brake friction joints could be employed, the criteria being that the leg is frictionally restrained in position but is movable upon the application of force.

Figure 2:
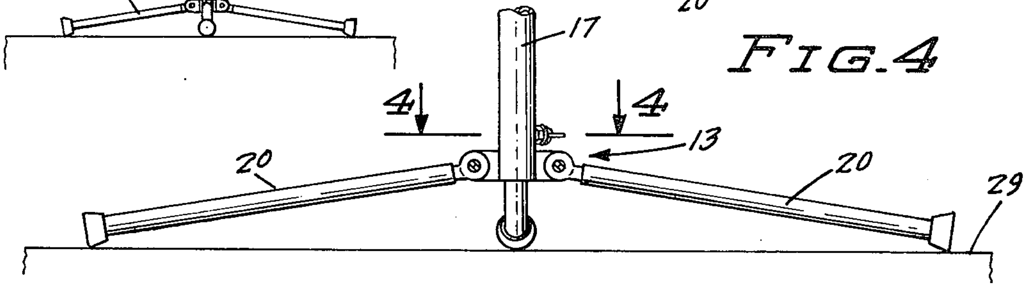
FIG. 2 is an enlarged elevational view of the base of the lamp stand with the column in a generally vertical orientation.
Figure 3:
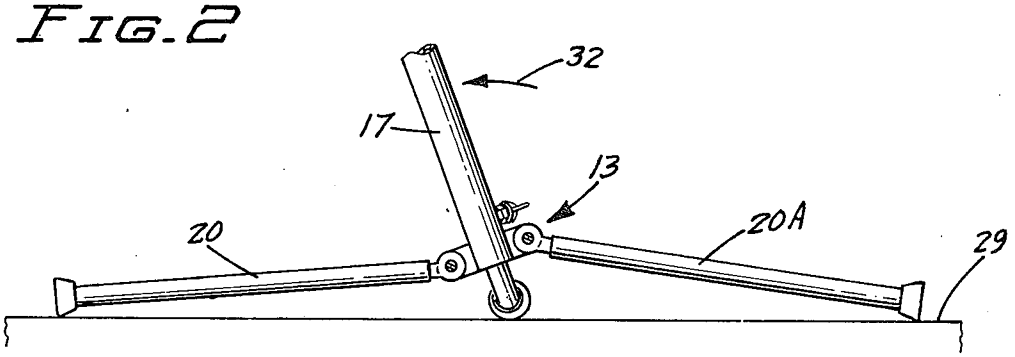
FIG. 3 is an enlarged elevational view of the base of the lamp stand with the column in a tilted orientation.

In use of the base 13, the lamp stand is erected on a ground or surface 29 with the column 12 in a generally vertical orientation, as shown in FIG. 2. The user of the lamp stand grasps the column 12 and rotates it to the desired position, as shown in FIG. 3. In order to prevent a leg from leaving the ground, the user may place a foot or the like on it, as by placing his foot on the leg 20A while rotating the column 12 away from it in the direction indicated by the arrow 32 in FIG. 3. The column remains in the tilted position as shown, with each of the legs 20 engaging the ground. The continuous brake friction joints 19 frictionally restrain the legs 20 in the desired position. It may be seen that the desired inclination of the column 12 may be achieved even though the stand is supported on sloping or irregular ground.

Figure 6:
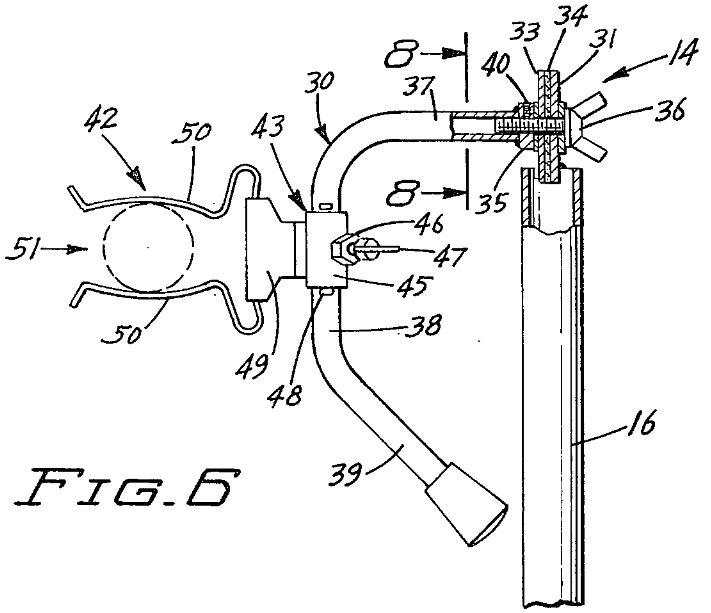
FIG. 6 is an enlarged elevational view of the lamp retaining means of the lamp stand with parts in section and parts broken away.
Figure 8:
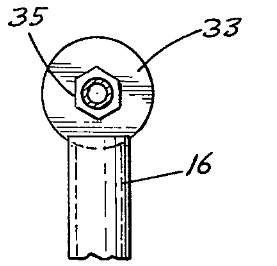
FIG. 8 is a sectional view of FIG. 6 taken along the line 8—8 of FIG. 6.
Figure 7:
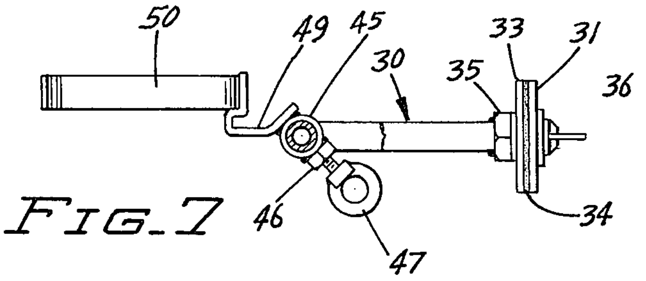
FIG. 7 is a top plan view of the lamp retaining means of FIG. 6 with parts in section and parts broken away.

Lamp retaining means 14 are movably mounted to an end of the shaft 16, as shown in FIGS. 6–8. An upwardly extending fixed plate 31 is secured, as by welding, to the end of the shaft 16. A second plate 33 is fixed to the end of a support arm 30 facing the first plate 31 and being frictionally pivotally associated with it. A fabric washer 34 is disposed between the plates 31, 33. The end of arm 30 abutting the second plate 33 is provided with an enlarged shoulder 35 having a threaded opening. The shank of a thumb screw 36 passes through mutually aligned holes provided in the plates 31, 33 and the washer 34, and is threaded into the shoulder 35. Sufficient tension is applied to the thumb screw 36 whereby the arm is frictionally restrained from rotation. A small set screw 40 is threaded laterally through the shoulder 35 and engages the shank of thumb screw 36 to secure it in the preselected position of applying the proper tension. Upon application of rotational force, the arm 30, the plate 33 and the thumb screw 36 rotate relative to the fixed plate 31. The fabric washer 34 functions as a slip brake between the first plate 31 and the second plate 33.

Support arm 30 has an interior section 37 extending outward from the plate 33 perpendicular to the longitudinal axis of the shaft 16. A middle section 38 extends 90 degrees from a first section 37, and a handle 39 extends angularly from the middle section 38. Clamp means 41 are rotatably mounted on the middle section 43 of support arm 30 and include a lamp holding spring clip 42 and a clamp 43. Clamp 43 has a tubular sleeve 45 surrounding the middle section 38 and adapted to rotate about it. An enlarged shoulder 46 on the sleeve 45, as, for example, a nut welded on the sleeve, is threaded to accommodate a set screw 47. Tightening of the set screw 47 secures the clamp means in the desired angular position on the arm 30 in the usual manner. A pair of cotter pins 48, 48 disposed on either side of the sleeve 45 prevent lateral movement of the sleeve on the arm 30.

A bracket 49 fastened to the sleeve 45 holds the clip 42. Clip 42 includes a pair of resilient symmetrical legs 50, 50 extending outward of bracket 49. The legs 50 define a space suitable to accommodate the handle of a lamp, and converge to form a throat 51 to securely hold a lamp handle in the clip 42.

In the use of the invention, the handle of a common trouble light or similar lamp is inserted in the clip 42 by the user, for example, a mechanic working on an automobile engine. Column 12 is rotated on base 13 until the lamp is in lighting proximity to the working area. Support arm 30 is rotated against the bias of the friction joint to achieve the desired angular orientation. Thumb screw 47 is loosened and clamp 43 is rotated on the arm 30 until the lamp is in the exact angular position to shed maximum light on the working area. Thumb screw 47 is then tightened to secure the lamp in place.

Figure 12:
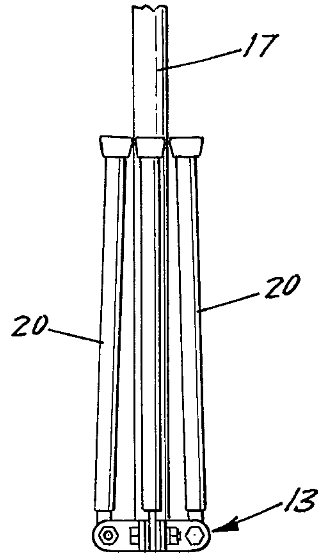
FIG. 12 is an elevational view of the base of the lamp stand in a collapsed configuration for storage.

As the lamp stand is light and portable, it is easily moved from place to place. When not in use, the lamp stand is collapsible for easy storage, as shown in FIG. 12. Shaft member 16 is fully telescoped into the pole member 17, and the legs 20 are pivoted fully upward against the pole member 17. The lamp stand is then easily hung on a wall or stored in a corner, or the like.

The lamp stand 10 is usable in a cramped area in close proximity to a wall or the like. In the erect, generally vertical position, as shown in FIG. 1, the stand 10 may be positioned closely adjacent a wall or the like by folding two adjacent legs 20 upward against the pole member 17. The stand is then positionable against a wall, the remaining two legs 20 extending outward from the wall and supporting the stand.

Figure 11:
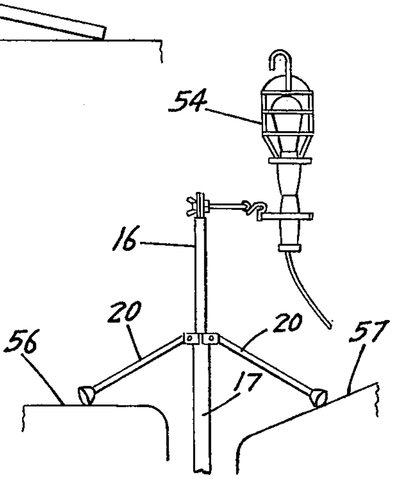
FIG. 11 is a fragmentary elevational view of the lamp stand of the invention disposed in an alternative upright orientation supported on a plurality of spaced apart surfaces.

Alternative uses of the invention are shown in FIGS. 9– 11. As shown by FIG. 4, pole member 17 is open-ended at the lower end as well as the upper end so as to be able to telescopically receive shaft 16 at either end. A second set screw or thumb screw 53 is threaded into a shoulder 52 provided near the base 13 on the pole member 17. The shaft 16 is removable from the upper end of the pole member 17 and insertable in the lower end, as shown in FIGS. 9–11, the set screw 53 being tightened to hold the shaft 16 in a preselected extended position relative to the pole member 17.

In FIGS. 9 and 10, the lamp stand of the invention is shown in a generally prone position holding a trouble light 54. A pair of adjacent legs 20 cooperate with the end of pole member 17 opposite base 13 to form a tripodal support for the shaft 16. Shaft 16 is positioned in the base end of the pole 17. The remaining pair of legs 20 are pivoted out of the way in a position adjacent the pole member 17. It may be seen that by angular adjustment of the two supporting legs 20, 20, the trouble light 54 is raised or lowered. Further, through the adjustments provided on the lamp retaining means 14, the angular orientation of the trouble light 54 is readily adjustable. The prone position of FIGS. 9 and 10 is particularly useful for lighting low areas or the underside of standing objects, for example, the lighting of an automobile tire when being changed, or the lighting of the underside of an automobile while a mechanic is working on a portion thereof. The trouble light may be extended beneath the automobile to fully illuminate the working area.

A further application of the lamp stand of the invention wherein the shaft member 16 is inserted in the base end of pole member 17 is shown in FIG. 11. The lamp stand 10 is supported between a plurality of surfaces 56, 57. The legs 20 are disposed at the proper angular orientation to engage the surrounding surfaces 56, 57 which may or may not be at the same vertical level. In such a position, the lamp stand is useful in illuminating hard-to-get-at areas. For example, the stand may be disposed beneath the open hood of an automobile, a leg 20 resting on the fender and other legs resting on the engine block or like structure. The angular orientation and height of the trouble light 54 are readily adjusted to furnish maximum illumination.

While there has been shown and described a single preferred embodiment of the invention, those skilled in the art will recognize the existence of other embodiments of the stand without departing from the scope of the invention. For example, photographers commonly mount cameras on stands referred to as "tripods". The stand of the present invention could be modified to accommodate a camera. On irregular or sloping ground, the stand would be readily adjustable to support the camera in a vertical orientation. Additionally, while the brackets 21 of the base 13 have been shown in fixed relation to the tubular member 17, it is understood that they could be secured on a suitable collar slidably mounted on the column 12 to be adjustable to any intermediate position on the column, with suitable fastening means to secure the collar in the selected position. It is also understood that a lamp could be permanently attached to the column 12.

The embodiments of the invention in which an exclusive property or privilege is claimed are defined as follows:

1. A lamp stand including:

an elongated column;

lamp retaining means disposed on said column adapted to retain a lamp;

base means disposed on one end of said column to support the column;

said base means including a plurality of outwardly extended legs, each said leg being independently and individually pivotally connected at one end thereof to said column by a continuous brake friction joint, each leg being frictionally restrained in an outwardly extended position to support the column and pivotally movable relative to the column upon application of manual force whereby the column is adjustable to any preselected angular position relative to the base;

said column including a shaft member and a hollow tubular pole member having a first open end;

said shaft member telescopically engageable with the pole member in the first open end thereof;

said lamp retaining means disposed on said shaft member adapted to releasably retain a portable lamp;

said base means disposed on said pole member;

first releasable securing means to secure the shaft member in telescopic engagement with the pole member;

said pole member having a second open end opposite the first open end to telescopically receive the shaft member, said shaft member being removable from the first open end and insertable in the second open end; and including second releasable securing means to secure the shaft member in telescopic engagement in the second open end of the pole member.

2. The lamp stand of claim 1 wherein:

said base means includes four legs symmetrically disposed about said pole member;

each of said continuous brake friction joint including a first portion constituted as a U-shaped bracket having a pair of opposing arms and a second portion constituted as a flange; one of said portions being connected to said pole member in proximity to an end thereof; the other of said portions being connected to the end of a leg, said flange being disposed between the opposing arms of said bracket; and first frictional pivot means operatively associating the flange and the bracket for pivotal movement of one with respect to the other.

3. The lamp stand of claim 2 including: washers of a material having properties of aluminum disposed on either side of said flange between the opposing arms of said bracket in each continuous brake friction joint and constituted as part of the first frictional pivot means.

4. The lamp stand of claim 1 wherein said lamp retaining means is adapted to releasably retain a portable lamp and including: an arm; means frictionally, movably mounting said arm on the column; clamp means rotatably assembled to the arm; said clamp means including a spring clip adapted to releasably engage a portion of a portable lamp.

5. A lamp stand including:

an elongated column;

lamp retaining means disposed on said column adapted to retain a lamp;

said lamp retaining means including an arm, a first plate attached to and extending outward from an end of the column; a second plate attached to an end of said arm, said first plate and second plate positioned in facing relationship, frictional pivot means connecting the first plate and the second plate for pivotal movement of the second plate with respect to the first plate upon application of manual force on the arm, clamp means rotatably assembled to the arm, said clamp means including a spring clip adapted to releasably engage a portion of a portable lamp;

base means disposed on one end of said column to support the column;

said base means including a plurality of outwardly extended legs, each said leg being independently and individually pivotally connected at one end thereof to said column by a continuous brake friction joint, each leg being frictionally restrained in an outwardly extended position to support the column and pivotally movable relative to the column upon application of manual force whereby the column is adjustable to any preselected angular position relative to the base.

6. The lamp stand of claim 5 wherein the end of the arm attached to the second plate has a threaded opening, including: a fiber washer disposed between the first plate and the second plate; a thumb screw passing through mutually aligned holes provided in the first plate and the second plate and the fiber washer and threaded into the opening in the arm; said fiber washer and thumb screw constituted as a portion of the second frictional pivot means connecting the first plate and the second plate.

7. A stand for holding an object including:
column means;
object retaining means disposed on the column means adapted to retain an object;
angularly adjustable base means to support the column means at a preselected angular position;
said base means including a plurality of support members shorter than the column means, independently and individually pivotally mounted on said column means, said members normally frictionally restrained from pivotal movement relative to said column means, and pivotally movable upon the application of manual rotational force whereby the column means is adjustable to any preselected angular position relative to the base;
said column means including a first elongated member and a second tubular elongated member open at both ends;
said base means being disposed at one end of the second tubular member;
said retaining means being disposed on the first member;
said first member being telescopically engageable with said second member in either end of said second member; and
means to releasably secure the first member in telescopic engagement with the second member.

8. The stand of claim 7 wherein said retaining means is adapted to releasably retain a portable lamp and includes: an arm movably movable mounted on the column; clamp means rotatably assembled to the arm, said clamp means including a spring clip adapted to releasably engage a portion of a portable lamp.

9. A lamp stand to releasably retain a portable lamp, including:
an elongated column having a shaft member and a hollow tubular pole member;
said tubular member being open at both ends;
one end of said shaft member being telescopically engageable with either end of the tubular member;
releasable securing means located at either end of the tubular member to secure the shaft member in telescopic engagement with either end of the tubular member;
lamp retaining means disposed on said shaft member adapted to releasably retain a portable lamp;
said lamp retaining means including an arm, means frictionally, movably mounting said arm on the shaft, clamp means rotatably assembled to the arm, said clamp means including a spring clip adapted to releasably engage a portion of a portable lamp;
a plurality of legs disposed on said tubular member adjacent one end thereof to support the column;
each leg being frictionally, pivotally assembled to the tubular member by a continuous brake friction joint, each said continuous brake friction joint including a first portion constituted as a U-shaped bracket having a pair of opposing arms and a second portion constituted as a flange, one of said portions being connected to said tubular member adjacent one end thereof, the other of said portions being connected to the end of a leg, said flange being disposed between the opposing arms of said bracket, and frictional pivot means operatively associating the flange and the bracket for pivotal movement of one with respect to the other.

* * * * *

UNITED STATES PATENT AND TRADEMARK OFFICE

CERTIFICATE OF CORRECTION

PATENT NO. : 3,961,176

DATED : June 1, 1976

INVENTOR(S) : LAWRENCE E. GLEASON

It is certified that error appears in the above-identified patent and that said Letters Patent are hereby corrected as shown below:

Column 7, Claim 8, line 3, "movably movable" should be --frictionally, movably--.

Signed and Sealed this

Nineteenth Day of October 1976

[SEAL]

*Attest:*

RUTH C. MASON
*Attesting Officer*

C. MARSHALL DANN
*Commissioner of Patents and Trademarks*